United States Patent [19]

Beukema

[11] 4,408,788
[45] Oct. 11, 1983

[54] HINGEABLE SPLIT PIPE COLLAR

[75] Inventor: John A. Beukema, Whitinsville, Mass.

[73] Assignee: Grinnell Fire Protection Systems Company, Inc., Cranston, R.I.

[21] Appl. No.: 305,030

[22] Filed: Sep. 23, 1981

[51] Int. Cl.³ .............................................. F16L 21/06
[52] U.S. Cl. .................................... 285/419; 285/112; 285/367
[58] Field of Search ............... 285/112, 373, 419, 367, 285/325, 409

[56] References Cited

U.S. PATENT DOCUMENTS

| 2,459,251 | 1/1949 | Stillwagon | 285/112 X |
| 3,024,046 | 3/1962 | Frost et al. | 285/112 X |
| 3,695,638 | 10/1972 | Blakeley | 285/112 |

FOREIGN PATENT DOCUMENTS 1414910  9/1965  France ................................ 285/373

Primary Examiner—Dave W. Arola
Attorney, Agent, or Firm—Salter & Michaelson

[57] ABSTRACT

A split collar for use with pipe and the like including a pair of discrete semicircular collar halves each having outwardly extending flanges at their terminal ends, and which halves cooperate to define an essentially circular opening. The inner surfaces of adjacent flanges abut along their inboard portions and then generally diverge. Aligned holes of elongated configuration are provided in the flanges to permit securing of the halves together in assembled relation with bolt and nut combinations or the like. The point where the inner surfaces of adjacent flanges commence to diverge is inboard of the inner edges of the bolt head and nut; and, as a result, the halves may be swung to a substantially open position after removal of one of the bolts only and without any loosening of the other bolt.

5 Claims, 8 Drawing Figures

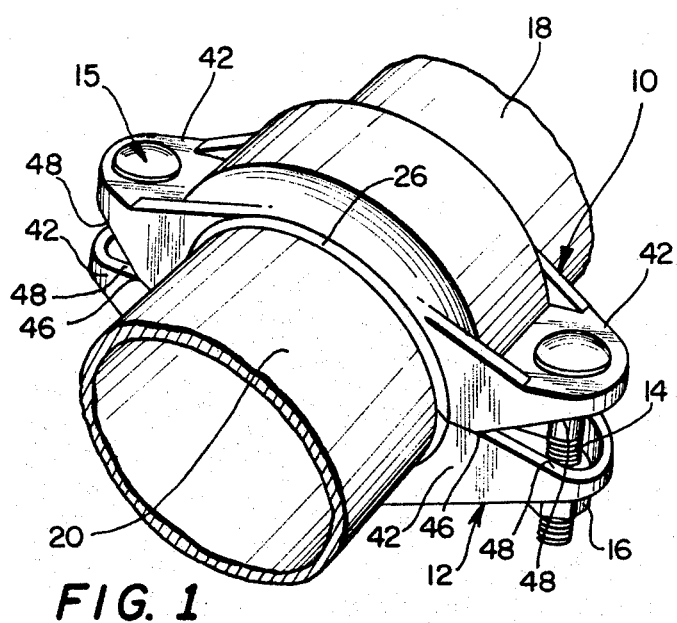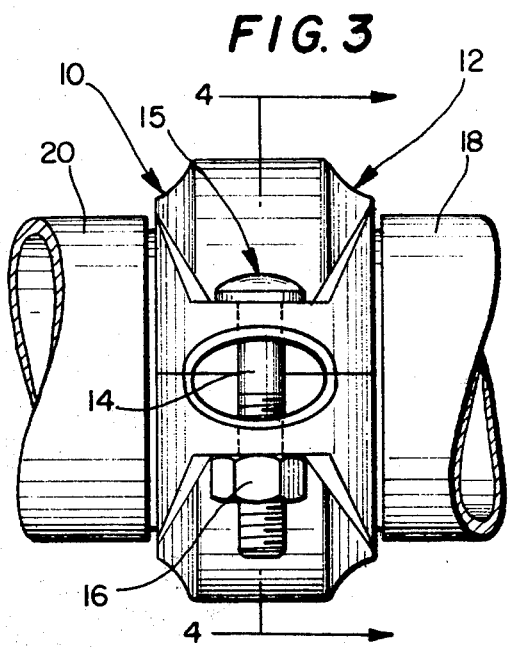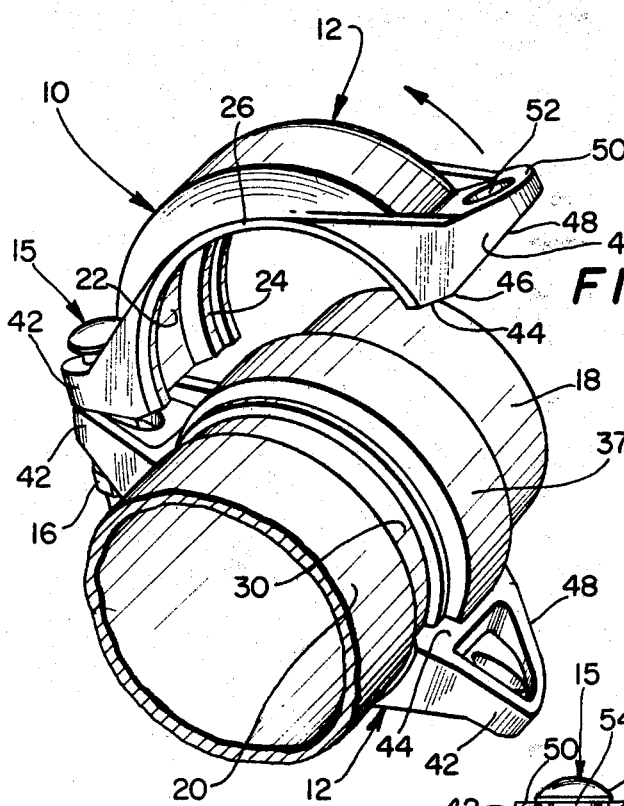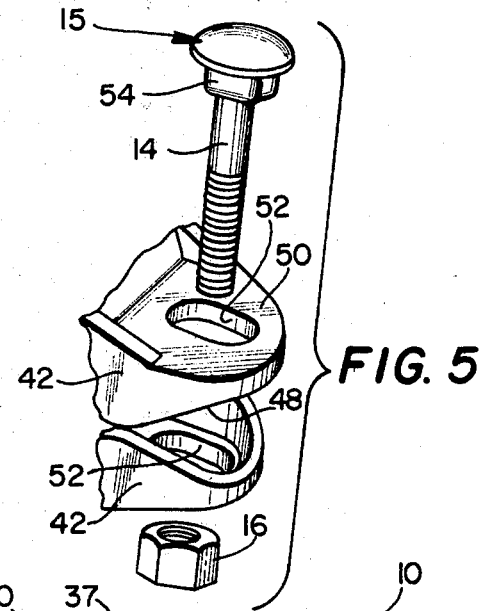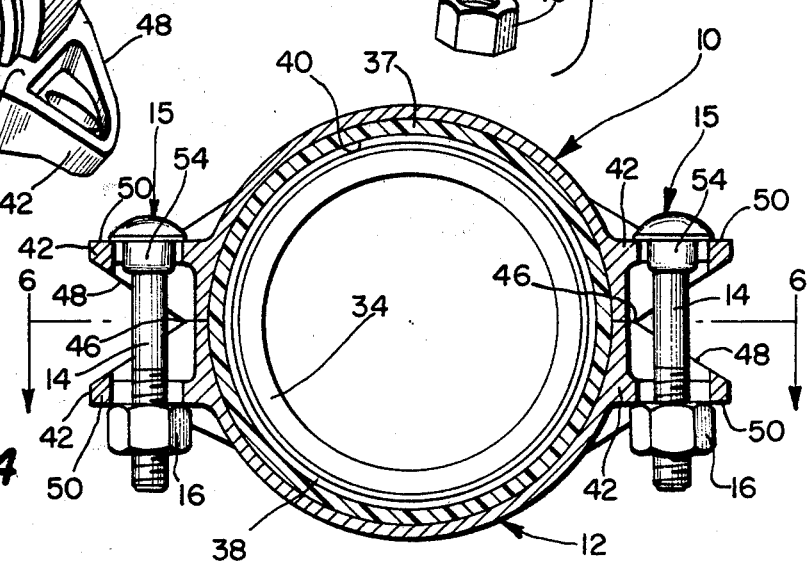

HINGEABLE SPLIT PIPE COLLAR

BACKGROUND OF THE INVENTION

The instant invention relates to a split collar for use with pipe and the like and more particularly to a novel split collar which is installable on or removable from a position of engagement with one or a pair of pipe sections simply by removing a single nut and bolt combination used to secure the halves together.

Split collars for use with pipe and the like have heretofore been available in various configurations for a number of applications. One of the primary applications for split collars has been as couplings to secure the ends of pairs of pipe sections together. Couplings of this type have generally included an inner channel on the arcuate inner surface thereof which is engageable with the grooved ends of a pair of pipe sections to thereby secure the sections together. In most instances couplings of this type have been used in combination with ring-like elastomeric gaskets which are positionable within the coupling around the adjoining ends of the pipe sections to seal said ends as the gasket is compressed by the coupling. The couplings heretofore available have primarily been of two general types, i.e., hingeable couplings comprising a pair of coupling halves which are permanently secured together in a hingeable manner, and non-hingeable couplings comprising a pair of discrete couplings halves which are detachably secured together at their ends usually with a pair of threaded nuts and bolts. Hingeable couplings are in most cases more convenient to use since they generally require manipulation of only a single nut and bolt to secure them to or remove them from a pair of pipe ends, but they are frequently rather expensive as a result of their complex hinging mechanisms. Further, they can only be opened from one side since they are permanently secured together. On the other hand, non-hingeable type couplings are relatively inexpensive but are somewhat less convenient to use than hingeable couplings. In some instances, the inconvenience of using a non-hingeable coupling may be relatively insignificant involving only a few additional manipulative steps. However, in other instances, such as when working in confined areas, the inconvenience of using such couplings may involve substantial amounts of unnecessary work. The instant invention is directed to a split collar or coupling for use with pipe and the like wherein the advantages of non-hingeable and hingeable couplings are combined to provide a coupling which is both relatively inexpensive and convenient to use.

Couplings representing the closest prior art of which the applicant is aware are illustrated in the U.S. patents to NEWEL, No. 2,377,510; STILLWAGON, No. 2,449,795; BOWNE, No. 3,006,663; and PIATEK, No. 3,054,629. These couplings generally fit into one of the two categories of couplings described, hingeable or non-hingeable. The instant invention is directed to a novel split collar which combines the advantage of the previously known split collars and couplings comprising a pair of relatively inexpensive discrete coupling halves, which are nevertheless hingeable.

SUMMARY OF THE INVENTION

The instant invention comprises a pair of collar halves which are secured together at their terminal ends with nut and bolt combinations or the like but are nevertheless hingeable relative to each other upon removal of only one of said nut and bolt combinations. The collar halves may be relatively inexpensively made by casting in a substantially semi-circular configuration and together they cooperate to define an essentially circular opening for receiving a section of pipe or the adjoining ends of a pair of pipe sections. Flanges are provided on each of the ends of the halves and aligned bolt holes are provided in the flanges to secure the halves together with nuts and bolts. The inner surfaces of adjacent flanges abut for a distance and then diverge outwardly with respect to each other to define included angles of 50° or more. The bolt holes in the flanges are of elongated configuration and are oriented so that the elongated dimensions thereof extend generally outwardly from the circular opening. In addition, the point where the inner abutting surfaces commence to diverge is at least as close to the circular opening as the inboard edges of the bolt heads or the nuts (closeness of the respective head or nut to the circular opening being defined by the perpendicular projection of the head or nut into the plane of the adjacent abutting surface rather then by a direct radial distance). As a result of the relationship between the bolt heads or the nuts and the divergent surfaces of the flanges, the collar halves are hingeable relative to each other upon removal of only one of the fastening bolt and nut combinations without having to loosen the other bolt and nut combination. When one of the bolt and nut combinations is removed, the collar halves are free to pivot on a fulcrum which is substantially at the point where the inner surfaces of the still connected adjacent flanges commence to outwardly diverge and since the bolt holes are of elongated section, the necessary clearance is provided so that the collar halves may hingedly move without binding on the unloosened bolt shank.

As a result of the relatively simple configuration of the collar halves, they may easily be cast of suitable materials and do not require machining prior to use. Consequently, the coupling of the instant invention can be manufactured substantially more economically than the hingeable couplings previously known. In light of this, the coupling of the instant invention represents a substantial improvement in the art which has significant commercial advantages over those couplings previously known.

It is therefore an object of the instant invention to provide a split collar for use with pipe or the like which includes a pair of discrete collar halves which are secured together with nut and bolt combinations at their terminal ends but which are hingeable relative to each other upon removal of one of said nut and bolt combinations.

Another object of the instant invention is to provide a hingeable split collar construction which is economical to manufacture.

Other objects, features and advantages of the invention shall become apparent as the description thereof proceeds when considered in connection with the accompanying illustrative drawings.

DESCRIPTION OF THE DRAWINGS

In the drawings which illustrate the best mode presently contemplated for carrying out the present invention:

FIG. 1 is a perspective view of a split collar made in accordance with the instant invention embodied as a pipe coupling securing the adjoining ends of a pair of pipe sections together;

FIG. 2 illustrates the coupling of FIG. 1 in open position;

FIG. 3 is a side elevational view of the coupling-pipe assembly;

FIG. 4 is a section taken on line 4—4 of FIG. 3;

FIG. 5 is an exploded fragmentary perspective view of a pair of adjacent coupling flanges with one of the nut and bolt combinations used for securing the coupling halves together;

DESCRIPTION OF THE INVENTION

Figure 6:
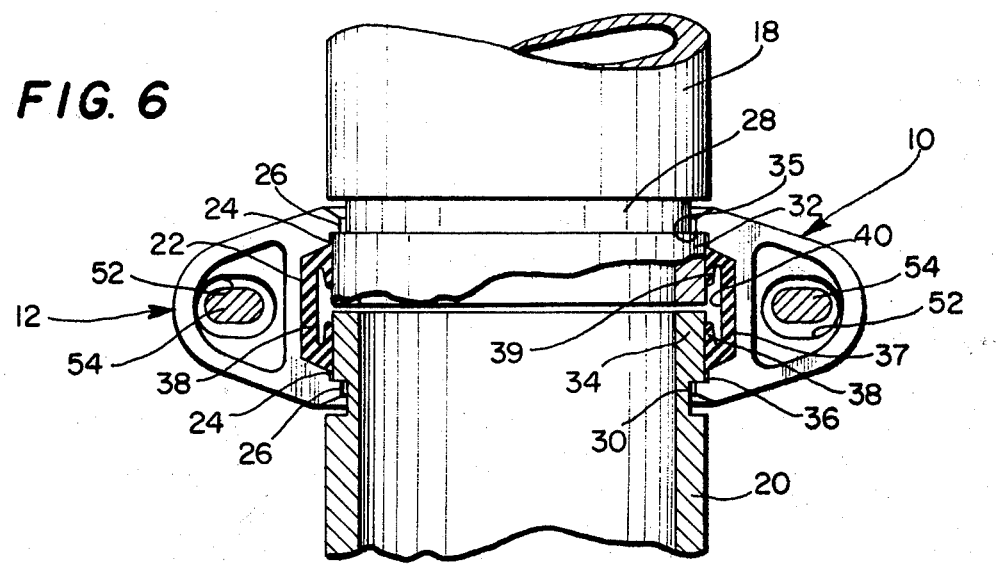
FIG. 6 is a section taken on line 6—6 of FIG. 4.
Figure 7:
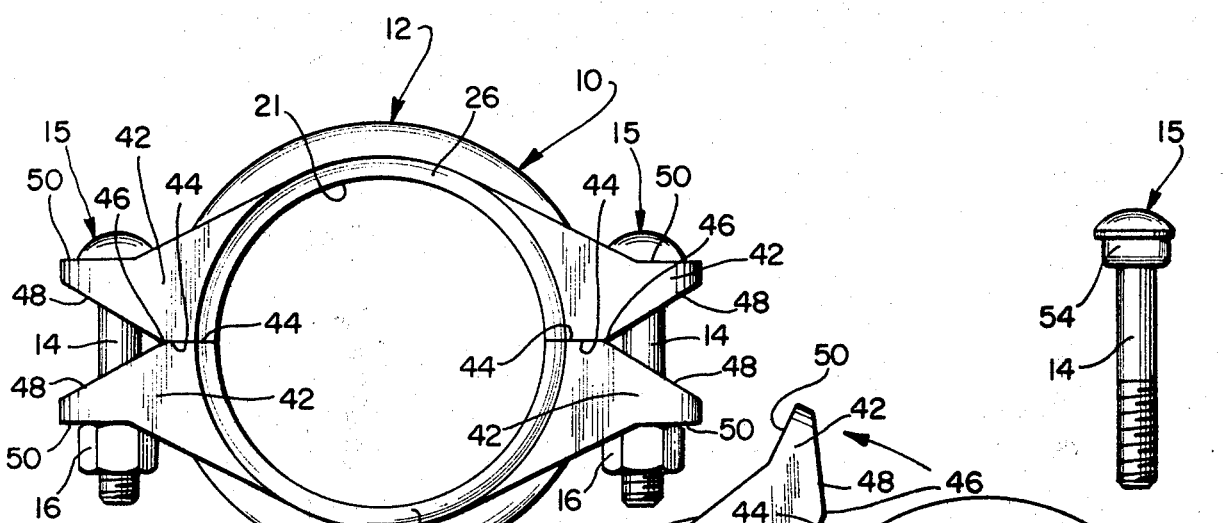
FIG. 7 is an elevational view of the coupling per se.

Referring now to the drawings, the split collar of the instant invention embodied as a pipe coupling is illustrated generally at 10. As will be noted, the coupling 10 comprises a pair of opposed coupling halves generally indicated at 12 which are secured together in assembled relation with threaded bolts 14 having heads 15 and threaded nuts 16 whereby the halves 12 cooperate to adjoin the ends of a pair of pipe sections 18 and 20 together in abutting or slightly spaced relation.

The inner configuration of each of the halves 12 is substantially semicircular so that the halves 12 together in assembled relation define a substantially circular opening 21 for receiving the adjoining ends of the pipe sections 18 and 20.

As will be seen particularly from FIGS. 2 and 6, in order to adjoin the ends of the sections 18 and 20, circumferential channels 22 having circumferential shoulder portions 24 which culminate in circumferential key sections 26 are provided on the inner surfaces of the halves 12. Circumferential grooves 28 and 30 are provided on the pipe sections 18 and 20, respectively, spaced inwardly from their respective terminal ends and defining terminal rims 32 and 34 on said pipe sections. The sections 18 and 20 are secured together with key sections 26 engaging within the grooves 28 and 30 as at 35 and 36, respectively, to adjoin said sections 18 and 20 in slightly spaced or abutting relation. A ring-like gasket 37 made of a suitable flexible gasket material such as rubber or the like and having lips 38 and 39 which define a compressible inner channel 40 is mounted within the channel 22 in engagement with the rims 32 and 34. As the halves 12 are secured together, the gasket 37 is compressed between the channel 22 and the rims 32 and 34 to thereby provide the desired sealing between the sections 18 and 20. In actual operation fluid pressures within the channel 40 further effect this sealing by causing further pressurized engagement of the lips 38 and 39 with the rims 32 and 34.

Outwardly extending flanges 42 are provided at the terminal ends of each of the halves 12. As will be seen, the inboard portions of the inner surfaces of the flanges 42 form abutting surfaces 44 which extend substantially diametrically from the circular opening 21. The inner surfaces of the flanges 42 then commence to diverge at fulcrums 46 to form outwardly divergent surfaces 48. The outer surfaces 50 of the flanges 42 are substantially parallel to the abutting surfaces 44 with aligned bolt holes 52 of elongated configuration being provided in the flanges 42 to secure them together. As will be seen, the bolt holes 52 are oriented so that the elongated dimensions thereof extend generally outwardly from the circular opening 21. The halves 12 then are securable together in assembled relation with the bolts 14 extending through the holes 52 in adjacent flanges 42 and then being secured by the nuts 16. Preferably, the bolts 14 are "track" type bolts having oblong step shanks 54 which are receivable in the holes but it is understood that other suitable bolts or other fastening means could be used.

Figure 8:
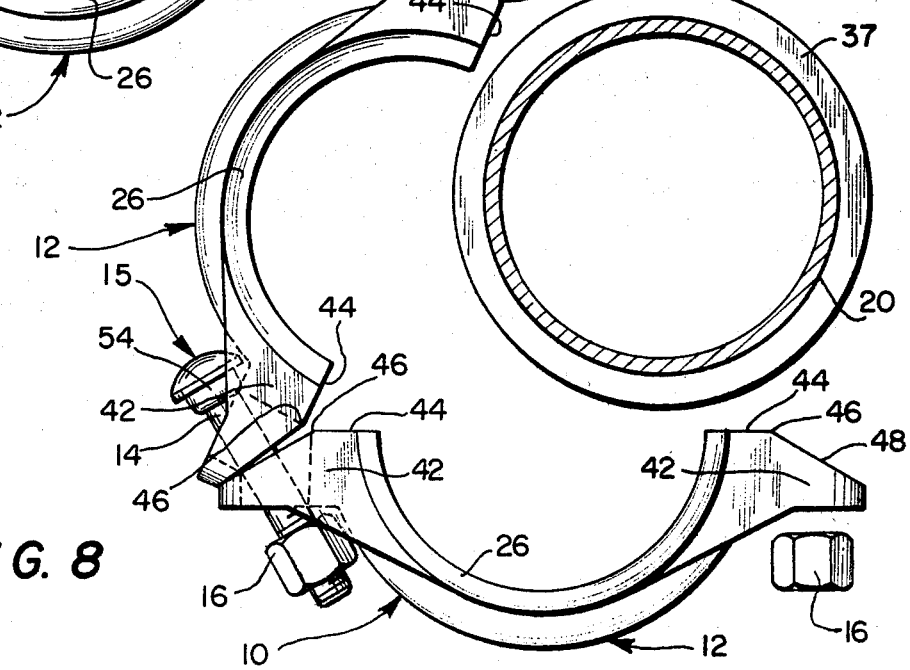
FIG. 8 is an elevational view of the coupling in the open position illustrating the hinging of the two halves thereof to provide clearance for insertion over or removal from a section of pipe or the like with an elastomeric gasket positioned thereon.

In order to allow the two halves 12 to hinge or pivot relative to each other, the holes 52 and the fulcrums 46 must be properly positioned to allow said halves 12 to pivot on the fulcrums 46 without applying an extending force to the adjacent bolt 14. In this connection it is essential that the inboard edges of the adjacent head 15 or nut 16 be no closer to the circular opening 21 than the adjacent fulcrums 46 (closeness of the adjacent head 15 or nut 16 to the opening 21 as herein used being defined by the radial distance in the plane of the adjacent surface 44 between the opening 21 and a normal projection of the inboard edge of the adjacent head 15 or nut 16 into said plane rather than a direct radial distance between said opening 21 and the inboard edge of the head 15 or nut 16). While it is understood that the coupling 10 can be constructed with the fulcrums 46 disposed further inwardly toward said circular opening 21, the fulcrums 46 must be at least as close to said opening 21 as the inboard edges of the adjacent head 15 or nut 16. With the fulcrums 46 disposed in this manner, the halves 12 may be hinged or pivoted relative to each other simply by removing one of the bolts 14 and it mating nut 16 from one pair of the adjacent flanges 42 without loosening the nut 16 and bolt 14 on the other pair of adjacent flanges 42. As will be seen, when the halves 12 are pivoted relative to each other, they pivot substantially on the fulcrums 46 adjacent to the remaining bolt 14 and since said fulcrums 46 are at least as close to the circular opening 21 as the inboard edges of the head 15 or nut 16 adjacent thereto, this pivoting is possible without causing an extending or stretching force to be applied on the remaining bolt 14. In addition, it is important that the holes 52 be of elongated section and oriented so that the elongated dimension thereof extend generally outwardly. In this manner sufficient clearance is provided so that the unloosened bolt 14 does not bind in its respective holes 52 as the halves 12 are pivoted. Finally, as will be seen most clearly from FIG. 8, the halves 12 must be free to pivot or open a sufficient amount to permit insertion over and/or removal from the pipe sections 18 and 20 when the gasket 37 is in place. The amount of relative pivotal movement of the halves 12 is determined substantially by the included angle defined by the divergent surfaces 48. In this connection it has been determined that in most instances a divergent included angle of at least 50° is necessary. It is understood, however, that while the surfaces 48 in the embodiment herein disclosed are defined generally by divergent planes, other configurations of the surfaces 48, such as divergent arcuate surfaces or the like may be possible.

It is seen therefore, that the instant invention provides a novel split collar or coupling construction which is easily suitable for economical mass production. The coupling halves may easily be cast from suitable materials and do not require expensive machining in their manufacture. The couplings do, however, have the substantial advantages over the two-piece split collars or couplings previously known in that the halves thereof are pivotable or hingeable relative to one another simply by removing a single nut and bolt, and without loosening the other nut and bolt.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A split collar for use with pipe and the like comprising a pair of opposed collar halves the inner surfaces of which cooperate to define a substantially circular opening having a central axis and an axial plane which contains said axis, outwardly extending flanges at each end of each of said halves, each of said flanges having a substantially flat inner surface which abuts the adjacent inner flange surface of the opposite half along a radial plane extending radially outwardly from said circular opening and substantially normal to said axial plane and which then diverges with respect to the opposite flange inner surface, aligned holes in said adjacent flanges, fastening means extending through said holes and substantially parallel to said axial plane operable to clamp said abutting inner surfaces of said adjacent flanges against each other to maintain said halves in assembled relation, said holes having substantial clearance inwardly and outwardly of said fastening means in a direction generally normal to said axial plane, the point at which said inner flange surfaces commence to diverge being located at least as close to said circular opening as the innermost edges of the adjacent fastening means in a direction substantially normal to said axial plane, whereby when one of said fastening means is completely removed, said halves may be swung outwardly with respect to each other without loosening the other fastening means, said outward swinging motion taking place substantially along a fulcrum located at the point where the inner surfaces of said still connected flanges commence to diverge.

2. In the split collar of claim 1, the inner surfaces of said adjacent flanges diverging to define included angles of at least 50°.

3. In the split collar of claim 1, the fastening means for at least one pair of said adjacent flanges comprising threaded nut and bolt means.

4. The split collar of claim 1 further characterized in that it functions as a pipe coupling, the inner surfaces of said halves having channels which cooperate to define a circular inner channel in said coupling, opposite sides of said channel being engageable within grooves provided adjacent to the ends of sections of pipe to be coupled.

5. In the split collar of claim 1, said aligned holes being of elongated dimension with the elongate dimension thereof extending outwardly from said circular opening substantially normal to said axial plane.

* * * * *